United States Patent
Zheng et al.

(10) Patent No.: US 11,154,055 B2
(45) Date of Patent: Oct. 26, 2021

(54) MICRO STRUCTURE AND ANTIFOULING ACTIVE SUBSTANCE SYNERGISTIC ANTIFOULING MATERIAL AND PREPARATION METHOD THEREOF

(71) Applicant: Luoyang Ship Material Research Institute, Luoyang (CN)

(72) Inventors: Jiyong Zheng, Luoyang (CN); Cunguo Lin, Luoyang (CN); Li Wang, Luoyang (CN); Zhiyong Sun, Luoyang (CN)

(73) Assignee: LUOYANG SHIP MATERIAL RESEARCH INSTITUTE, Luoyang (CN)

( * ) Notice: Subject to any disclaimer, the term of this patent is extended or adjusted under 35 U.S.C. 154(b) by 3 days.

(21) Appl. No.: 16/616,946

(22) PCT Filed: Mar. 15, 2018

(86) PCT No.: PCT/CN2018/079063
§ 371 (c)(1),
(2) Date: Nov. 25, 2019

(87) PCT Pub. No.: WO2019/010995
PCT Pub. Date: Jan. 17, 2019

(65) Prior Publication Data
US 2020/0390093 A1    Dec. 17, 2020

(30) Foreign Application Priority Data
Jul. 10, 2017  (CN) .......................... 201710556739.4

(51) Int. Cl.
| *A01N 25/34* | (2006.01) |
| *A01N 43/80* | (2006.01) |
| *A01N 43/36* | (2006.01) |
| *A01N 37/18* | (2006.01) |
| *A01N 55/02* | (2006.01) |
| *B63B 59/04* | (2006.01) |

(52) U.S. Cl.
CPC ............ *A01N 25/34* (2013.01); *A01N 37/18* (2013.01); *A01N 43/36* (2013.01); *A01N 43/80* (2013.01); *A01N 55/02* (2013.01); *B63B 59/04* (2013.01)

(58) Field of Classification Search
None
See application file for complete search history.

(56) References Cited

U.S. PATENT DOCUMENTS

| 4,910,252 A | 3/1990 | Yonehara et al. |
| 6,265,515 B1 | 7/2001 | Mera et al. |
| 2010/0227111 A1 | 9/2010 | Breur |

FOREIGN PATENT DOCUMENTS

| CN | 101818024 A | 9/2010 |
| CN | 102040742 A | 5/2011 |
| CN | 102304233 A | 1/2012 |
| CN | 102399487 A | 4/2012 |
| CN | 102417792 A | 4/2012 |
| CN | 103351309 A | 10/2013 |
| CN | 103819986 A | * 5/2014 |
| CN | 104212320 A | 12/2014 |
| CN | 105602380 A | 5/2016 |
| CN | 107177050 A | 9/2017 |
| GB | 1457590 A | 12/1976 |
| JP | H05228426 A | 9/1993 |
| JP | 2012126103 A | 7/2012 |
| JP | 2012183752 A | 9/2012 |

OTHER PUBLICATIONS

Song, Y.; et al. "Liquid-capped encoded microcapsules for multi-plex assays" Lab on a Chip, 2017, 17, 429-437, published online Dec. 19, 2016. (Year: 2017).*
Diaz, C.; et al. "Synergistic antimicrobial effect against early biofilm . . . " International Journal of Antimicrobial Agents, 2012, 40, 221-226. (Year: 2012).*
DeCrop et al. (ACS Appl. Mat. & Interf., 2017, 9, 10418-10426) (Year: 2017).*
Sigma-Aldrich "silicone oil" https://www.sigmaaldrich.com/catalog/product/aldrich/378356?lang=en&region=US, no pagination, no date.*
Yang, L. et al. "High efficiency fabrication of complex . . . " Optics Express, 2017, 25(7), 8144-8157.*
Halder P. et al. , An assessment of the dynamic stability of microorganisms on patterned surfaces in relation to biofouling control, The Journal of Bioadhesion and Biofilm Research, 2014 , vol. 30, No. 6, ISSN: 0892-7014, 695-707.
A.V Tulcidas et al. , Friction reduction on recent non-releasing biocidal coatings by a newly designed friction test rig, Tribology International 91, 2015, 140-150.
Goa, Haiping et al., Study on Antifouling Properties of Surface Microtopographies, Paint and Coatings Industry, 2010, p. 76-78,vol. 40—No. 1.

* cited by examiner

*Primary Examiner* — Erin E Hirt
(74) *Attorney, Agent, or Firm* — Bayramoglu Law Offices LLC

(57) ABSTRACT

A micro structure and antifouling active substance synergistic antifouling material and a preparation method thereof are provided. The micro structure and antifouling active substance synergistic antifouling material includes a matrix arrangement formed by a plurality of micro structure basic units in a cylindrical structure, an inner lower layer of each micro structure basic unit is filled with an antifouling active substance, and an inner upper layer of the each micro structure basic unit is filled with a sealing agent. A process for preparing a micro structure and antifouling active substance synergistic antifouling material includes three steps of preparing a micro structure, preparing a liquid antifouling active substance and preparing a synergistic antifouling material.

2 Claims, 2 Drawing Sheets

MICRO STRUCTURE AND ANTIFOULING ACTIVE SUBSTANCE SYNERGISTIC ANTIFOULING MATERIAL AND PREPARATION METHOD THEREOF

CROSS REFERENCE TO THE RELATED APPLICATIONS

This application is the national phase entry of International Application No. PCT/CN2018/079063, filed on Mar. 15, 2018, which is based upon and claims priority to Chinese Patent Application No. 201710556739.4, filed on Jul. 10, 2017, the entire contents of which are incorporated herein by reference.

TECHNICAL FIELD

The present disclosure belongs to the technical field of marine antifouling materials, and particularly relates to a micro structure and antifouling active substance synergistic antifouling material and a preparation method thereof. The micro structure having a regular annular surface is synergistic with the releasable antifouling active substance to prevent biofoulings on surfaces of ships and marine structures in a marine environment.

BACKGROUND

A phenomenon that marine fouling organisms, including microorganisms, marine plants and marine animals, attach to surfaces of marine structures and cause adverse effects on the marine structures is called marine biofouling. The marine structures that are troubled by the marine biofouling include ships, docks, wharfs, oil platforms, submarine cables, buoys, power plant cooling pipes, and fishing nets, etc. The marine structures suffered from common fouling organisms including algae, hydra, sponges, serpulidae, bivalves, barnacles and sea squirts for a long time, which causes adverse effects including increased navigation resistance of ships, blockage of sea-going pipelines, reduced thermal conductivity of cooling equipment or reduced catches, thus resulting in serious economic losses. In order to prevent the harm of marine biofouling, the most common methods used in the past were to paste copper sheets or smear asphalt protective coatings on underwater surfaces of the marine structures. In the prior art, an antifouling coating is generally applied for protection. The antifouling coatings include an antifouling agent type, a fouling release type, a fouling inhibiting type and an unreleased antifouling agent type. For the antifouling agent type coatings, antifouling agents are continuously released to an interface between the coatings and seawater, forming a thin layer with a certain concentration, thereby inhibiting adhesion of fouling organisms and prevent biofouling. UK patent GB1457590 discloses a triphenyltin-contained antifouling coating having an antifouling effect of more than five years. However, the antifouling coating containing toxicant will cause serious adverse effects on marine ecological environment, and organotin has been banned. The fouling releasing type coating makes use of its characteristics of low surface energy and low elastic modulus to make marine fouling organisms not easy to adhere to its surface, even if adhering to its surface, marine fouling organisms are also not firmly adhered, and readily washed off under an action of water flow, thus achieving an antifouling purpose. A low surface energy silicon-fluororesin antifouling coating, disclosed in U.S. Pat. No. 6,265,515, is prepared by a reaction of trimethylsilane-terminated poly (methylhydrosiloxane) with nonafluorohexene, and has a long antifouling period. A low surface energy antifouling coating disclosed in U.S. Pat. No. 4,910,252 is prepared by using ambient cured silicone rubber, and has an antifouling period of more than 2 years. Japanese patent 1993-2284261 discloses an antifouling coating having excellent flexibility and elasticity, using an elastic epoxy resin or an elastic polyurethane latex as a base material, marine organisms have low adhesion strength and are easily removed with high-pressure water, and the elastic layer will not be peeled off or destroyed. Meanwhile, Chinese patent 201010142998.0 also discloses an emulsion type organosilicons antifouling coating, a preparation method and an application thereof. The fouling inhibiting type coating makes fouling organisms not attached to marine structures directly through special properties or molecular groups of the surface, such as a di-ionic surface, an amphiphilic surface, a hydrophobic surface, an oleophobic surface, etc. Chinese patent 201010531302.3 discloses a surface material with an anti-protein adsorption property and a preparation method thereof, wherein the antifouling surface material is prepared by modifying di-ionic molecules on surfaces of organosilicon materials. US patent US20100227111 discloses a fibre villus anti-fouling coating composed of fibers having a thickness of at least 50 microns and a length of at least 3 millimeters. A ratio of the thickness and the length of fibers is at least 0.01. A density of fibre pillars is less than 40 fibres/mm$^2$. A fibre coating can be directly applied to marine materials such as ropes, building fittings and hulls, etc. The unreleased antifouling agent type coating is the latest development of antifouling coatings. The antifouling agent is covalently bonded to a silicone system. The antifouling agent is released from the silicone coating, but produces a better antifouling effect. Tulcidas et al. (Tribology International, 91 (2015): 140-150) developed this new antifouling coating by combining the antifouling agent Econea with oroganosilicons and polyurethanes.

In summary, biofouling occurs at a seawater/material interface contacting organisms, and a condition of a solid surface directly affects an attachment behavior of a fouling organism. Therefore, constructing special surfaces is an important way to develop new antifouling materials and technologies. It is well known that an antifouling agent release layer on a surface of a coating material can significantly inhibit an adhesion of the fouling organism. However, with a dissolution, a hydrolysis, a polishing and the like of a coating layer, a saponification layer is thickened, and the antifouling agent release layer gradually changes. A concentration of an antifouling agent gradually declines as time elapses until reaching a value difficult to inhibit the fouling organism, which is a main reason that the antifouling agent type coating has a limited service life. On the other hand, a micro structure of the solid surface also affects attachment behaviors and detachment behaviors of bacteria, algae spores and invertebrate larvae. A material having the micro structure is usually a silicone system, which basically does not dissolve or hydrolyze in seawater, thus having a relatively long-term stability. However, due to the presence of organic matter and inorganic particles in natural seawater, the surface micro structure will be blocked and lose its antifouling effect after a period of immersion. If the antifouling agent release layer can be combined with the micro structure, the saponification layer can be avoided hindering the release of the antifouling agent, and meanwhile, the micro structure is prevented from being blocked through an update and a blocking effect of the antifouling agent release layer. Antifouling properties of the surface micro structure and the antifouling active substance are superimposed to achieve synergistic antifouling performance, thus realizing the preparation of new antifouling materials combining the surface micro structure with the antifouling active substance and technological innovation.

SUMMARY

In order to overcome the defects of the prior art, the objective of the present disclosure is to develop and design a novel antifouling material combining a surface micro structure with an antifouling active substance for a synergistic antifouling and a technology thereof. An annular well-shaped micro structure has a certain height to area ratio, and a concave portion of the micro structure is filled with a solid antifouling agent, and sealed with an encapsulant, so as to form a novel antifouling material having microstructural properties and the antifouling agent. The novel antifouling material can well inhibit attachments of marine organisms thereon, and protect surfaces of underwater facilities in a marine environment from biofouling for a long time.

In order to achieve the above-mentioned objective, a micro structure and antifouling active substance synergistic antifouling material of the present disclosure includes a matrix arrangement formed by a plurality of micro structure basic units in a cylindrical structure. An outer diameter of each micro structure basic unit is 20 micrometers, an inner diameter of the each micro structure basic unit is 10 micrometers, an interval of the micro structure basic units is 20 micrometers, and a depth of the each micro structure basic unit is 5-20 micrometers, an inner lower layer of the each micro structure basic unit is filled with an antifouling active substance, and an inner upper layer of the each micro structure basic unit is filled with an sealing agent.

The each micro structure basic unit of the present disclosure is an organosilicon (polydimethylsiloxane) surface micro structure; the antifouling active substance includes isothiazolinone, Econea (ship antifouling agent), salicylamide antifouling agent, Irgarol (2-tert-butylamino-4-cyclopropylamino-6-methylthio-s-triazine) and zinc pyrithione; the sealing agent includes polydimethylsiloxane silicone oil, perfluoropolyether, paraffin, and polyethylene glycol hydrogel.

A process of preparing a micro structure and antifouling active substance synergistic antifouling material according to the present disclosure includes three steps of preparing a micro structure, preparing a liquid antifouling active substance and preparing a synergistic antifouling material:

(1) Preparing the micro structure: firstly, using an electron beam to etch a circular photomask on a silicon wafer, etching the silicon wafer by a deep silicon etching method, and controlling an etching depth by adjusting an etching time to prepare a micro structure basic unit having a cylindrical structure with a depth of 5-20 micrometers; adding a certain mass of polydimethylsiloxane into a paper cup, adding a certain mass of curing agent to the paper cup, uniformly stirring the polydimethylsiloxane and the curing agent with a glass rod, and then putting into a vacuum dryer; maintaining at a vacuum pressure of 580 Pa for 10 min, and then taking out; finally, sealing a top edge of the micro structure basic unit with a tape, immersing the micro structure basic unit completely in the polydimethylsiloxane and curing agent, putting the paper cup into the vacuum dryer, maintaining at a vacuum pressure of 170 Pa for 30 min, and then taking out, and carrying out a curing in a room temperature environment for 48 hours, removing the tape to obtain a organosilicon (polydimethylsiloxane) surface micro structure having a cylindrical structure;

(2) Preparing the liquid antifouling active substance: preparing a certain mass of solid antifouling active substance into a liquid antifouling active substance by melting or dissolving in a solvent;

(3) Preparing the synergistic antifouling material: dropwise adding the liquid antifouling active substance prepared in the step (2) to an inside of the organosilicon (polydimethylsiloxane) surface micro structure prepared in the step (1), absorbing 10-400 μg of the liquid antifouling active substance on a square centimeter of the organosilicon (polydimethylsiloxane) surface micro structure by cooling or vacuumization, then adding the sealing agent to a surface of the organosilicon (polydimethylsiloxane) surface micro structure to cover the antifouling active substance, wherein an adding amount of the sealing agent to the surface of each square centimeter of the organosilicon (polydimethylsiloxane) surface micro structure is 10-200 μg, to obtain a organosilicon (polydimethylsiloxane) surface micro structure and antifouling active substance synergistic antifouling material.

Compared with the prior art, the present disclosure provides an antifouling material having a regular annular micro structure on a surface. The antifouling active substance is stored inside the annular well-shaped structure, and through the synergistic antifouling action of the micro structure and the antifouling active substance, the adhesion of the fouling organism is prevented. The micro structure basic unit is annular and closely arranged to form an array. The annular pattern is etched on the surface of the silicon wafer by an etching method, and a micro structure is prepared by a method of replicating polydimethylsiloxane. The antifouling active substance diffuses to the surface of the micro structure through the sealing agent, and the antifouling active substance has a certain solubility in the sealing agent, therefore, the antifouling active substance can diffuse slowly to an opening of the micro structure, forming an effective concentration of the antifouling agent release layer on the surface of the micro structure to inhibit the growth of fouling organisms. Meanwhile, the sealing agent with blocking effect can prevent the antifouling active substance from spreading or being eroded too quickly, and also prevent the micro structure from being blocked by the marine biological particles, further slowing down the dissolution of the antifouling active substance, and prolonging the antifouling effect. The annular pattern and arrangement of micro structure with a relatively large curvature reduce the contact area between fouling organisms and materials, and reduce the attachment sites of fouling organisms, thus making fouling organisms hard to attach, and easy to fall of even if attached. At the same time, the well-shaped concave portion stores the antifouling active substance as a container, thereby effectively preventing the adhesion of fouling organisms such as ulva spores and diatoms, etc. The components are simple in structure and do not contain nitrite, phosphate and heavy metals. It has good metal corrosion protection effect and good bacterium growth inhibition effect. It is environmentally friendly and safe to use. It utilizes the micro structural properties of the surface and antifouling active substances to carry out a synergistic antifouling, which is a new antifouling material based on new principles and new technologies, having good promotion and application prospects.

DETAILED DESCRIPTION OF THE EMBODIMENTS

Figure 1:
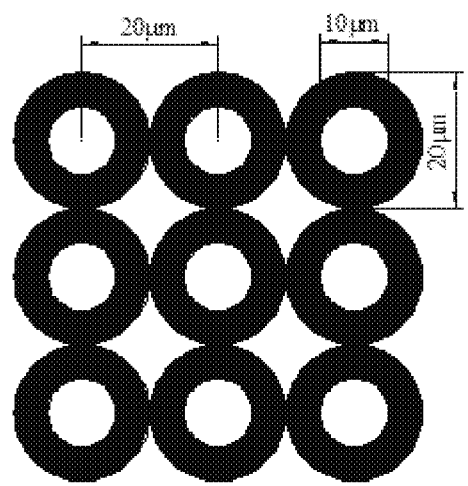
FIG. 1 is a schematic view showing a size and an arrangement of micro structure units according to the present disclosure.
Figure 2:
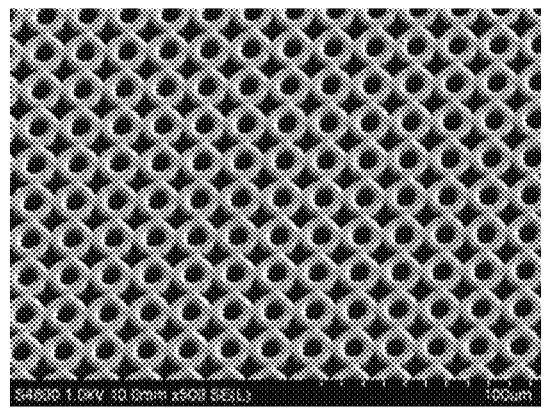
FIG. 2 is a scanning electron micrograph of a micro structure unit having a depth of 20 micrometers according to the present disclosure.
Figure 3:
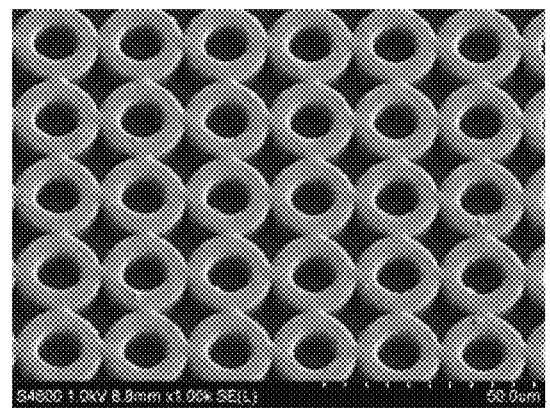
FIG. 3 is a scanning electron micrograph of a micro structure unit having a depth of 10 micrometers according to the present disclosure.
Figure 4:
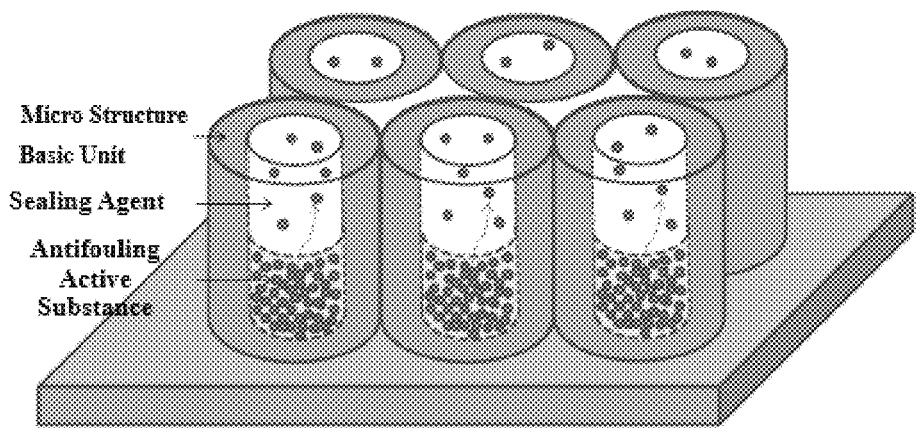
FIG. 4 is a schematic view showing a structure principle of a micro structure and antifouling active substance synergistic antifouling material according to the present disclosure.
Figure 5:
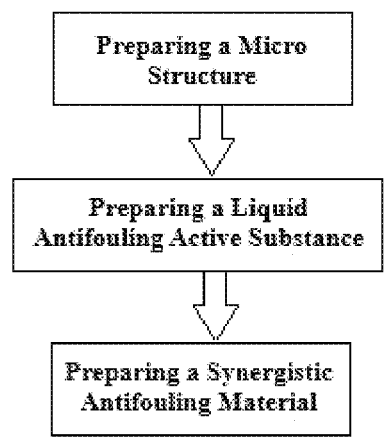
FIG. 5 is a process flow diagram of a method for preparing a micro structure and antifouling active substance synergistic antifouling material according to the present disclosure.

The present disclosure is further described below with reference to embodiments and accompanying drawings.

Embodiment 1

A micro structure and antifouling active substance synergistic antifouling material of the present embodiment includes a matrix arrangement formed by a plurality of organosilicon (polydimethylsiloxane) micro structure basic units having a cylinder structure. An outer diameter of each micro structure basic unit is 20 micrometers, an inner diameter of the each micro structure basic unit is 10 micrometers, an interval of the micro structure basic units is 20 micrometers, and a depth of the each micro structure basic unit is 20 micrometers. An inner lower layer of the each micro structure basic unit is filled with a salicylamide antifouling agent, and an inner upper layer of the each micro structure basic unit is filled with polydimethylsiloxane silicone oil.

A process for preparing a micro structure and antifouling active substance synergistic antifouling material according to the present embodiment includes three steps of preparing a micro structure, preparing a liquid antifouling active substance and preparing a synergistic antifouling material:

(1) Preparing the micro structure: firstly, an electron beam was used to etch a circular photomask on a silicon wafer, the silicon wafer was etched by a deep silicon etching method, and an etching depth was controlled by adjusting an etching time, so as to prepare a micro structure basic unit having a cylindrical structure with a depth of 20 micrometers. 20 g of polydimethylsiloxane was added into a paper cup, 2 g of curing agent was added to the paper cup, the polydimethylsiloxane and the curing agent were uniformly stirred with a glass rod, and the paper cup was put into a vacuum dryer for maintaining at a vacuum pressure of 580 Pa for 10 min, and then the paper cup was taken out. Finally, a top edge of the micro structure basic unit was sealed with a tape, the micro structure basic unit was immersed completely in the polydimethylsiloxane and curing agent, the paper cup was put into the vacuum dryer for maintaining at a vacuum pressure of 170 Pa for 30 min, and then the paper cup was taken out and cured in a room temperature environment for 48 hours, the tape was removed to obtain a organosilicon (polydimethylsiloxane) surface micro structure having a cylindrical structure;

(2) Preparing the liquid antifouling active substance: 300 g of the salicylamide antifouling agent mentioned in the Chinese patent No. 201310314717.9 was heated and melted at 60° C. to obtain a liquid salicylamide antifouling agent;

(3) Preparing the synergistic antifouling material: the liquid salicylamide antifouling agent prepared in the step (2) was added dropwise to an inside of the organosilicon (polydimethylsiloxane) surface micro structure prepared in the step (1), was and then placed in a constant temperature vacuum dryer at 60° C. for maintaining at a vacuum pressure of 170 Pa for 30 min. 200 µg of polydimethylsiloxane silicone oil was added dropwise to a surface of the organosilicon (polydimethylsiloxane) surface micro structure, and again placed in the constant temperature vacuum dryer with a vacuum pressure of 170 Pa to make the salicylamide antifouling agent encapsulated by the polydimethylsiloxane silicone oil, so as to obtain a organosilicon (polydimethylsiloxane) surface micro structure and salicylamide antifouling agent synergistic antifouling material.

When the micro structure and antifouling active substance synergistic antifouling material prepared in the present embodiment was subjected to an adhesion test of ulva spores, polydimethylsiloxane without micro structures was used as a comparison material. A concentration of newly released ulva spores was diluted to $1\times10^6$ cells/ml with sterilized seawater, after 24 h, an adhesion amount of the ulva spores on the comparision material was 220 cells/mm$^2$, an adhesion amount of the ulva spores on the synergistic antifouling material prepared in the present embodiment was 0 cell/mm$^2$, and an inhibition rate was 100%, which showed that the synergistic antifouling material prepared in the present embodiment has remarkable ulva spores control performance compared with the comparison organosilicon material.

Embodiment 2

A micro structure and antifouling active substance synergistic antifouling material of the present embodiment includes a matrix arrangement formed by a plurality of organosilicon (polydimethylsiloxane) micro structure basic units having a cylindrical structure. An outer diameter of each micro structure basic unit is 20 micrometers, an inner diameter of the each micro structure basic unit is 10 micrometers, an interval of the micro structure basic units is 20 micrometers, and a depth of the each micro structure basic unit is 20 micrometers. An inner lower layer of the each micro structure basic unit is filled with isothiazolinone antifouling agent, and an inner upper layer of the each micro structure basic unit is filled with perfluoropolyether.

A process for preparing a micro structure and antifouling active substance synergistic antifouling material according to the present embodiment includes three steps of preparing a micro structure, preparing a liquid antifouling active substance and preparing a synergistic antifouling material:

(1) Preparing the micro structure: firstly, an electron beam was used to etch a circular photomask on a silicon wafer, the silicon wafer was etched by a deep silicon etching method, and an etching depth was controlled by adjusting an etching time, so as to prepare a micro structure basic unit having a cylindrical structure with a depth of 5 micrometers. 5 g of polydimethylsiloxane was added into a paper cup, 0.5 g of curing agent was added to the paper cup, the polydimethylsiloxane and the curing agent were uniformly stirred with a glass rod, and the paper cup was put into a vacuum dryer for maintaining at a vacuum pressure of 580 Pa for 10 min, and then the paper cup was taken out. Finally, a top edge of the micro structure basic unit was sealed with a tape, the micro structure basic unit was immersed completely in the polydimethylsiloxane and curing agent, the paper cup was put into the vacuum dryer for maintaining at a vacuum pressure of 170 Pa for 30 min, and then the paper cup was taken out and cured in a room temperature environment for 48 hours, the tape was removed to obtain a organosilicon (polydimethylsiloxane) surface micro structure having a cylindrical structure;

(2) Preparing the liquid antifouling active substance: 300 g of isothiazolinone antifouling agent was dissolved in 1 ml of xylene at 60° C. to obtain a liquid isothiazolinone antifouling agent;

(3) Preparing the synergistic antifouling material: the liquid isothiazolinone antifouling agent prepared in the step (2) was added dropwise to an inside of the organosilicon (polydimethylsiloxane) surface micro structure prepared in the step (1), was and then placed in a constant temperature vacuum dryer at 40° C. for maintaining at a vacuum pressure of 170 Pa for 30 min. 100 μg of perfluoropolyether was added dropwise to the surface of the organosilicon (polydimethylsiloxane) surface micro structure, and again placed in a constant temperature vacuum dryer with a vacuum pressure of 170 Pa to make the isothiazolinone antifouling agent encapsulated by the perfluoropolyether to obtain a organosilicon (polydimethylsiloxane) surface micro structure and isothiazolinone antifouling agent synergistic antifouling material.

When the micro structure and antifouling active substance synergistic antifouling material prepared in the present embodiment was subjected to an adhesion test of diatoms, polydimethylsiloxane without micro structures was used as a comparison material. A concentration of the diatoms was diluted to $1 \times 10^5$ cells/ml with sterilized seawater, after 24 h, an adhesion amount of the diatoms on the comparison material was 737 cells/mm$^2$, an adhesion amount of the diatoms on the synergistic antifouling material prepared in the present embodiment was 24 cells/mm$^2$, and an inhibition rate was 96.7%, which showed that the synergistic antifouling material prepared in the present embodiment has remarkable diatoms control performance compared with the comparison organosilicon material.

What is claimed is:

1. A synergistic antifouling material, comprising a microstructure and an antifouling active substance, wherein the microstructure is a matrix arrangement formed by a plurality of microstructure basic units, and each microstructure basic unit is a hollow cylindrical structure having a wall thickness of 5 micrometers; wherein an outer diameter of each microstructure basic unit of the plurality of microstructure basic units is 20 micrometers, an inner diameter of each microstructure basic unit is 10 micrometers, a center-to-center spacing of the plurality of microstructure basic units is 20 micrometers, a depth of each microstructure basic unit is 5-20 micrometers, an inner lower layer of each microstructure basic unit is filled with the antifouling active substance, and an inner upper layer of each microstructure basic unit is filled with a sealing agent;

wherein each square centimeter of a surface of the microstructure is filled with 10-400 μg of a liquid of the antifouling active substance and 10-200 μg of the sealing agent and the antifouling active substance diffuses to an opening of the microstructure through the sealing agent.

2. The synergistic antifouling material of claim 1, wherein each microstructure basic unit is an organosilicon surface microstructure and the organosilicon surface microstructure is made of polydimethylsiloxane; the antifouling active substance is a salicylamide antifouling agent; and the sealing agent is selected from the group consisting of polydimethylsiloxane silicone oil, perfluoropolyether, paraffin, and polyethylene glycol hydrogel.

* * * * *